Patented Sept. 6, 1932

1,875,473

UNITED STATES PATENT OFFICE

RALPH H. McKEE, OF JERSEY CITY, NEW JERSEY

PROCESS OF AND COMPOSITION FOR STIMULATING PLANT GROWTH

No Drawing.  Application filed December 11, 1929.  Serial No. 413,432.

This invention relates to a process of and composition for stimulating plant growth, and more particularly to the treatment of plant growth whereby the growth is simultaneously stimulated and freed from insects.

The principal object of this invention is to provide a simple and efficient process of and composition for stimulating plant growth, by which is meant not only the strengthening of growing plants but also the increasing of their size at a rate which is more rapid than their natural rate of growth, and, in addition, hastening the flowering of buds and decreasing the normal dormant period of tubers, such as dahlias and potatoes.

Other objects and advantages of the invention will become apparent during the course of the following description.

As is well known, tubers, such as potatoes, ordinarily have a dormant period, or period of rest, i. e. a potato dug in September and planted shortly thereafter will not grow even though the climate and soil are favorable to its growth. The potato requires a long period of rest before it will grow. This is also true of most plant buds and of the plant organism in general. If, however, a potato is dipped into a solution of sodium thiocyanate (NaCNS), or of thiourea $(SC(NH_2)_2)$, or of ethylene chlorhydrin $(C_2H_4Cl(OH))$, it will sprout a month earlier than if it had not been thus treated. Moreover, a similar effect may be obtained by exposing the plant bud or the tuber to the vapors of ethylene $(C_2H_4)$, ethylene chlorhydrin $(CH_2Cl.CH_2OH)$, or ethylene dichlorid $(C_2H_4Cl_2)$. Of these, ethylene chlorhydrin has been considered by the workers in this art as being preferable for use because of the fact that it can be dissolved in water as well as vaporized.

It has also been found that plant changes can be stimulated by treatment with ethylene and it is a quite common practice at the present time to treat a car or warehouse of citrous fruit with ethylene in order to change the color from green, as if unripe, to the characteristic yellow of ripe fruit. In addition, ethylene has been found to stimulate plant growth. For example, buds treated with this material will start to grow and flower earlier than they would if they had not been so treated.

While the foregoing methods of treatment have proved to be satisfactory, they have been attended by certain disadvantages such as the expense of the processes and the lack of insecticidal value of the treating agents employed. The principal purpose of this invention is to provide a relatively inexpensive, and at the same time efficient, method of stimulating plant growth by the use of vapors of shale oil, which are insecticidal as well as stimulating to the plant.

In its broad aspect, my process comprises exposing plant growth, such as growing plants or tubers, to an atmosphere containing shale oil in the vapor phase. In the preferred practice of my process, I employ the vapors resulting from heating a distillate fraction of crude shale oil, and especially vapors of shale oil kerosene, i. e. the distillate fraction distilling from 150° to 300° C. This type of shale oil has previously been used in liquid form as an insecticide. (See my Patent No. 1,744,324.) This distillate contains approximately 10% of pyridin derivatives such as tri-methyl pyridin, varying amounts of olefinic hydrocarbons and saturated hydrocarbons, and small amounts of other classes, such as pyrroles, diolefinic hydrocarbons and the like. A part of the nitrogen compounds have unsaturated side-chains and partake to some extent of the character of alkaloids.

While I prefer to use the 150°—300° C. distillate fraction of shale oil it will be obvious that the invention is not limited to the use of this fraction. These temperature limits include a portion of the shale oil gasoline fraction, i. e. the 150° to 225° C. boiling fraction but even the whole of the gasoline fraction may be used. The use of higher boiling fractions such as the gas-oil fraction which boils between, roughly, 300° and 400° C. is not recommended because of the difficulties encountered in employing the higher boiling fractions. The concentration of the vapors used is materially in excess of that which would result from the evaporation of shale oil, shale oil kerosene or shale oil distillate under ordinary conditions at atmospheric temperatures.

The process is particularly adapted for use in commercial greenhouses where the process may be carried out in any one of several ways. For example, the shale oil product used may be heated by an electric heater or by a flame and allowed to evaporate into the greenhouse. The preferred method is to heat the shale oil product in an open vessel and pass a current of air such as would be produced by a fan over the open-heated vessel so as to blow the vapors rapidly through the atmosphere of the greenhouse. Another method which is particularly desirable for use at those seasons of the year when the humidity of the greenhouse is at a low point, consists in distilling the shale oil product with steam. For example, the distillate employed may be mixed with water in the approximate proportions of one part of the former to four parts of the latter and the mixture heated in a suitable vessel by means of a flame so that the water will boil and the steam carry away the distillate floating on top of the water.

In addition to stimulating plant growth in the manner described, the shale oil vapors will give a fair kill of insect pests. In a customary treatment where approximately 5cc. of shale oil distillate employed are vaporized for each 100 cubic feet of greenhouse space, a substantial percentage of insects present will be killed in approximately fifteen minutes. Tests have demonstrated that the treatment is effective against the European red mite (*Paratetranychus pilosus* C. & F.) and of apple aphis (*Aphis pomi* DeGeer), red spider (*Tetranychus telarius* Linn.), thrips, and other insect pests.

Unless the plants are very sensitive to burning by the insecticide, the preferred procedure is to allow the fumigating vapors to remain in the greenhouse for a number of hours, such as over night. On the other hand, if the plant is particularly susceptible to injury, such as is true of tomato plants, it is desirable to fumigate but lightly on a series of days, say three in succession, or fumigate heavily and open up the windows and ventilate the greenhouse in an hour or two after fumigation. Either of these procedures protects the most sensitive plants and at the same time allows the desired plant stimulation to take place and also the killing of the insect pests.

The practical advantage of the present invention will be apparent. For example, by the use of the present invention such flowers as chrysanthemums, fuchia, geraniums, roses, carnations, hollyhocks and the like, may at will be made to bloom at desired times of the year, such as for the Christmas trade or for the Easter trade. At the same time the process is effective to destroy injurious insect life which is so troublesome in commercial greenhouses.

While I have described in detail the preferred embodiment of my invention it is to be understood that the details of procedure may be variously modified without departing from the spirit of the invention or the scope of the subjoined claims.

I claim:

1. The process of stimulating plant growth comprising exposing the plant under treatment to an atmosphere containing vapors from shale oil, the concentration of said vapors being materially in excess of that which would result from the evaporation of shale oil under ordinary conditions at atmospheric temperatures.

2. A process of stimulating plant growth comprising exposing the plant under treatment to a shale oil distillate in vapor phase, the concentration of the vapors being materially in excess of that which would result from the evaporation of said shale oil distillate under ordinary conditions at atmospheric temperatures.

3. A process of stimulating plant growth comprising exposing the plant under treatment to vapors of shale oil kerosene, the concentration of said vapors being materially in excess of that which would result from the evaporation of said shale oil kerosene under ordinary conditions at atmospheric temperatures.

4. A process of stimulating the growth of plants and simultaneously killing insects thereon which comprises exposing said plants to an atmosphere containing a shale oil distillate in vapor phase, the concentration of the vapors being materially in excess of that which would result from the evaporation of shale oil under ordinary conditions at atmospheric temperatures.

5. An insecticidal plant stimulant comprising vapors of shale oil, the concentration of said vapors being materially in excess of that which would result from the evaporation of shale oil under ordinary conditions at atmospheric temperatures.

6. A plant stimulant of the character described comprising a shale oil distillate in vapor phase, the concentration of the vapors being materially in excess of that which would result from the evaporation of said shale oil distillate under ordinary conditions at atmospheric temperatures.

7. A plant stimulant of the character described comprising a distillate fraction of shale oil distilling between approximately 150° and 300° C., in vapor phase.

8. A plant stimulant of the character described comprising the vapor phase of the 150° to 300° C. distillate fraction of crude shale oil.

In testimony whereof I affix my signature.

RALPH H. McKEE.